March 31, 1964     T. A. WEIL     3,127,573
PULSING CIRCUIT WITH RETURN OF ENERGY TO SOURCE
Filed May 19, 1959     2 Sheets-Sheet 1
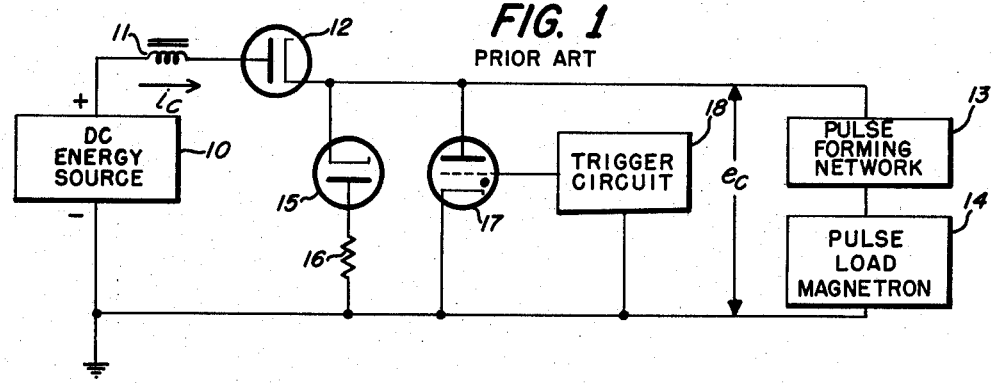
INVENTOR
THOMAS A WEIL
ATTORNEY March 31, 1964  T. A. WEIL  3,127,573
PULSING CIRCUIT WITH RETURN OF ENERGY TO SOURCE
Filed May 19, 1959  2 Sheets-Sheet 2

INVENTOR
THOMAS A. WEIL
BY H. Vincent Harsha
ATTORNEY

_United States Patent Office_

3,127,573
Patented Mar. 31, 1964

3,127,573
PULSING CIRCUIT WITH RETURN OF
ENERGY TO SOURCE
Thomas A. Weil, Wellesley Hills, Mass., assignor to
Raytheon Company, Lexington, Mass., a corporation of
Delaware
Filed May 19, 1959, Ser. No. 814,224
6 Claims. (Cl. 331—87)

This invention relates generally to regulator systems and, more particularly, to regulator systems for use with energy charging circuits such as those used to supply energy for thyratron pulse modulators.

In conventional radar transmitting systems utilizing magnetrons or other types of transmitting tubes, it is necessary to supply excitation pulses for said magnetrons. One particularly suitable means for doing this involves the use of a thyratron modulator wherein a charging coil supplies a voltage to suitable pulse forming networks operating in conjunction with a hydrogen-thyratron tube to provide suitable pulses at a desired controllable voltage level. In order to maintain the magnetron peak operating currents at specific values within tolerances of a few percent, such modulators must be provided with means for regulating the current delivered to the load. In the presence of input line voltage variations, it is well known that variations in magnetron peak currents will be as high as 40 percent of the desired value unless suitable regulation is provided.

Many types of regulators have been used in the past, and all of those used prior to this invention are subject to a number of disadvantages. For example, magnetic amplifier regulators have relatively slow response. Ferro-resonant line stabilizers are not helpful where line frequency is apt to vary. Grid control rectifier circuits have a limited ambient temperature range of operation in addition to being slow in response. D.-C. power supply regulators have often been used and, although they do provide ripple reduction, unfortunately they do not provide efficient operation, and, hence, wasted power results from their use. Another regulation means that has been proposed involves the use of a triode clamping tube connected across the charging choke coil or across a secondary winding coupled to it. However, such a circuit is not only inefficient, but also has a limited control range.

The circuit of this invention provides a regulation system which is not subject to the disadvantages of the prior art circuits mentioned above. One particular embodiment of the regulator system of the invention utilizes a triode which operates as a switching device and is connected in series with the charging coil. A second triode is used to control the switching operation of the series triode so that the charging current is disconnected at the correct time when the desired charging voltage is reached. The point at which the series triode is cut off depends upon the value of the output charging voltage. A clamping circuit is also coupled to the charging choke coil and to the energy source. The clamping circuit is used to return to the energy source the unused energy remaining in the charging circuit when the charging coil has been disconnected from the load, so that a very high efficiency results from the overall operation of the circuit of the invention.

The operation of the invention can be best understood with the help of the drawing in which:

FIG. 1 shows a conventional prior art thyratron pulse modulator;

FIG. 2 shows the charging current and voltage wave forms existing in the conventional modulator circuit shown in FIG. 1;

FIG. 3 shows a particular embodiment of the charging regulator circuit of the invention utilizing a series triode controlled by a second triode and utilizing a diode clamping circuit for returning energy to the source;

FIG. 6 shows a damping network used in conjunction with the charging reactor-transformer utilized in the circuit of the invention shown in FIG. 3.

Figure 4:
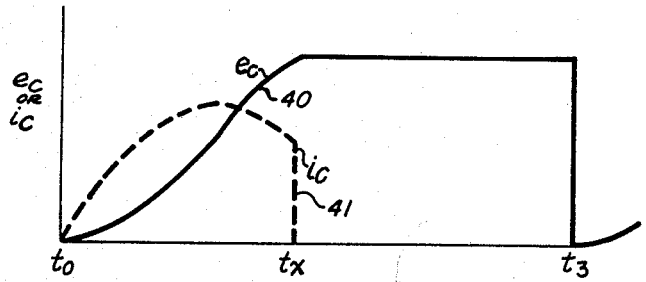
FIG. 4 shows the charging current and voltage wave forms occurring in the charging regulator of the circuit of the invention shown in FIG. 3.

A conventional thyratron pulse modulator as shown in FIG. 1 utilizes a D.-C. energy source 10, one side of which is connected to ground and the other side of which is connected to one end of a charging choke 11. The other end of choke 11 is connected to the plate of a diode 12, the cathode of which is connected to one side of a conventional pulse forming network 13. Pulse forming network 13 is connected to a pulse load 14 which may be, for example, a pulse transformer and a magnetron type of radar transmitting tube. Shunted across the pulse forming network and pulse load is a second diode 15, the cathode of which is connected to the cathode of diode 12 and the plate of which is connected to ground through a resistor 16. A thyratron 17 is connected from the cathode of diode 12 to ground. The grid of thyratron 17 is connected to a conventional trigger circuit 18 which causes it to fire at predetermined points in time in accordance with well-known operation in circuits of this type.

Diode 12 is used to maintain the pulse forming network voltage at its peak value after charging is complete until such time as the thyratron is fired. This operation is commonly called "hold-off" and diode 12 is conventionally referred to as the "hold-off" diode. Diode 15 is used to insure that the pulse forming network 13 is fully discharged soon after the thyratron is fired even though there is mismatch between the impedance of the pulse load and the impedance of the pulse forming network. This action insures that the peak charging voltage of network 13 will not change with variations in pulse load impedance, such as magnetron sparking.

FIG. 2 shows curves of charging voltage and charging current for a single charging cycle wherein the charging voltage $e_C$ (across network 13 and load 14) begins to increase at time $t_0$. When the peak value of charging voltage $e_C$, denoted by the point P on the graph, is reached, diode 12 ceases to conduct and the series circuit comprising coil 11, diode 12, network 13 and load 14 is opened. At that point, the charging current $i_C$ is zero as shown by dashed curve 19 of FIG. 2, and the voltage remains at the desired charging level until thyratron 17 is fired at $t_3$ by the action of trigger circuit 18. When thyratron 17 fires, the charging voltage goes to zero and the charging cycle repeats.

FIG. 3 shows a particular embodiment of the circuit of the invention. In that circuit, a D.-C. source of energy 24 has one side connected to a reference ground point and the other side connected to one end of the primary coil 25 of the reactor-transformer 23. The other end of primary coil 25 is connected directly to the plate of a triode 26 and to the plate of a triode 27 through plate resistance 28. The plate of triode 27 is connected to the grid of triode 26. The cathode of triode 26 is connected to an output circuit which, as in FIG. 1, is comprised of a pulse forming network 29 which is, in turn, connected to a pulse load 30 which may, as explained with reference to FIG. 1, be a pulse transformer and a magnetron tube. A resistance divider network comprising a first fixed resistor 31 and a second variable resistor 32 is connected from the cathode of triode 26 to the reference ground. The grid of triode 27 is connected to the junction point of resistors 31 and 32. The cathode of triode 27 is connected to a D.-C. reference source 33. As in the circuit of FIG. 1, a thyratron 34 is connected from the cathode of triode 26 to ground, and its grid is connected to a trigger circuit 37 as explained with reference to FIG. 1. A secondary coil 35 of reactor-transformer 23 is connected from ground to the plate of a diode 36. The cathode of diode 36 is connected to the positive side of energy source 24.

In describing the operation of the circuit of the invention, the pulse load is assumed to present negligible impedance to the charging current, and the coils 35 and 25 are assumed to have equal turns. Initially, at time $t_0$, representing the start of a charging cycle, as shown in FIG. 4, triode 26 has zero or even a slightly positive bias applied because triode 27 is cut off due to the application of a D.-C. voltage on the cathode from D.-C. reference source 33. As current flows through the primary coil 25, the voltage $e_C$ across pulse forming network 29 (and the negligible amount across pulse load 30) rises as shown by solid line curve 40 of FIG. 4. As the voltage $e_C$ rises, the voltage across resistor 32 increases until it equals that of source 33, thus causing triode 27 to conduct.

When triode 27 conducts, its plate voltage drops. The voltage applied between the grid and cathode of triode 26 is equal to the instantaneous plate voltage of triode 27 minus the charging voltage $e_C$. When the plate voltage of triode 27 drops, a negative bias is thus applied to the grid of triode 26 such that the triode 26 is then cut off. The current through primary charging coil 25 is, therefore, interrupted and the charging current $i_C$ drops to zero as shown in FIG. 4 by dashed line curve 41. The charging voltage $e_C$ remains at a substantially constant level until the time $t_3$ at which point the trigger circuit 37 supplies a pulse, causing thyratron 34 to fire and, thus, reduce the charging voltage to zero. At time $t_3$, the charging cycle begins over again and goes through the same sequence as shown in FIG. 4 from $t_0$ to $t_3$.

As can be seen in FIG. 4, the waveform 40 for the charging voltage $e_C$ and the waveform 41 for the charging current $i_C$ are similar to those shown in FIG. 2 for the conventional thyratron pulse modulator up to the point $t_X$. Triode 26 acts as a switching element to open the charging circuit at time $t_X$ when the desired level of charging voltage is reached. This time can be set by adjusting variable resistor 32 to cause conduction of triode 27 when the voltage across resistor 32 reaches a predetermined desired level which is proportional to the charging voltage. If the supply voltage should change, the conduction of series triode 26 will be interrupted at a different time but at the same charging voltage level, therefore providing regulation as desired.

Figure 5:
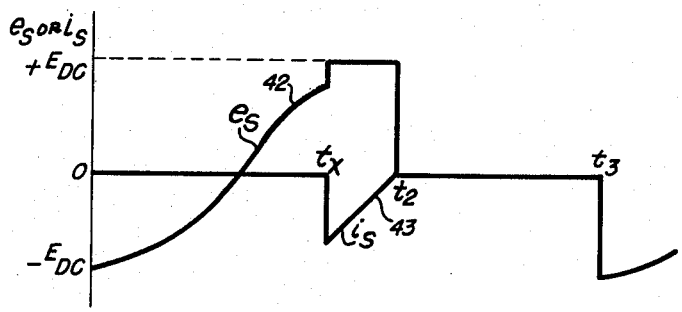
FIG. 5 shows the voltage and current waveforms existing in the clamping circuit of the invention shown in FIG. 3.

The action of the clamping circuit comprising diode 36 and secondary coil 35 can be explained with the help of the waveforms shown in FIG. 5. When the current through primary charging coil 25 is interrupted at the time triode 26 is cut off, the voltage $e_S$ across secondary coil 35 rises abruptly to a value such that the plate of diode 36 is substantially equal to $E_{DC}$ and causes diode 36 to conduct. This rise in voltage occurs at time $t_X$ and is shown by the curve 42 of FIG. 5 and is designated in that figure as $e_S$. When conduction of diode 36 occurs, the energy stored in primary charging coil 25 is transferred to the secondary circuit and is returned to the D.-C. energy source through diode 36. The current in diode 36, designated in FIG. 5 as $i_S$, is reduced in a linear fashion to zero, as shown by curve 43 in FIG. 5 over a time period from $t_X$ to $t_2$. This linear waveform results from the fact that a substantially constant voltage is applied across the inductance of the secondary circuit.

Thus, the energy that is stored in the primary coil 25 is returned to the D.-C. energy source through the clamping circuit so that very high efficiency of operation results. In practice, the turns ratio of the reactor-transformer 23 is chosen to provide maximum efficiency of energy return.

Due to the leakage inductance which may exist between the primary and secondary coils of reactor-transformer 23, high frequency ringing may occur on the voltage on primary coil 25 between time $t_X$ and $t_2$ after triode 26 is cut off. This ringing may be reduced or eliminated by providing a damping circuit 50, such as is shown in FIG. 6, across primary coil 25. The damping circuit shown is a conventional series connection of a resistor 51 and a condenser 52.

Any capacity from the grid of triode 26 to ground will tend to apply negative grid bias to triode 26 as its cathode voltage rises rapidly during the charging cycle. The resultant drop across triode 26 will cause an undesirable power loss to occur. This effect may be minimized by shielding the grid circuit of series triode 26 from ground with a shield connected to the cathode of triode 26 and by selecting control triode 27 to have a low plate to cathode capacitance.

In the conventional thyratron pulse modulator shown in FIG. 1, diode 15 was used to prevent excessive voltage buildup on the pulse forming network under conditions of mismatched load or under conditions of sparking of the load. In the charging regulator of the invention, however, such a diode is not required since the switching action of series triode 26 is controlled by the charging voltage itself that is built up on the pulse forming network and load. For example, if the load is mismatched and the voltage is built up at a greater or lesser rate than shown in FIG. 4, switching occurs at a different time from that shown in the figure; switching still occurs, however, at the desired output voltage level.

Although control triode 27 and series triode 26 are shown as particular means for controlling the time at which the charging circuit is opened, it is not to be construed that this configuration represents the only means of controlling the switching operation desired. Other convenient methods of control will occur to those skilled in the art within the scope and spirit of the invention. A general control circuit is illustrated in block diagram form in FIG. 7. In that figure, a sensing element 54 is connected across the pulse forming network and pulse load and is responsive to the charging voltage $e_C$ to provide a voltage proportional to the charging voltage at its output 55. A reference element 56 provides a fixed voltage at its output 57. A comparator circuit 58 is connected to the outputs of sensing and reference elements 55 and 57, respectively, and compares the values of their output voltages to supply a control signal to a control amplifier 59. Control amplifier 59 is used to control the switching time of a switching device 60 in response to the control signal from comparator 58. Sensing element 54 may be adjustable so that the control circuit may be actuated at whatever charging voltage level is desired.

Figure 7:
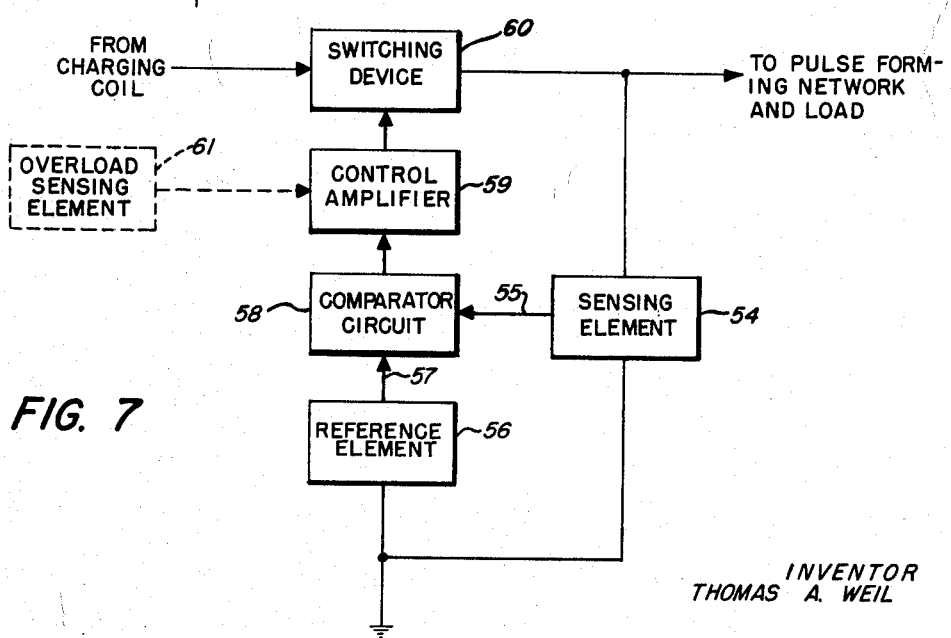
FIG. 7 shows a block diagram of a portion of the circuit of the invention wherein a generalized control system is utilized for controlling the operation of the switching device corresponding to the specific elements shown in the circuit of FIG. 3.

Any convenient elements may be used in the general control system shown in FIG. 7 and many specific circuits will occur to those skilled in the art. In FIG. 3, for example, sensing element 54 corresponds to voltage divider network 31 and 32 and reference element 56 corresponds to D.-C. reference source 33. In FIG. 3, control amplifier 59 and comparator 58 are combined and correspond to the control triode 27. Switching device 60, of course, corresponds to series triode 26.

Another specific embodiment may include a multivibrator as the control amplifier. The comparator element may be a trigger circuit which provides one pulse when the voltage at the sensing element rises above a predetermined value and another trigger pulse when the voltage drops below a predetermined value. The multivibrator is arranged to have bistable operation wherein it operates in one mode to open the switching device when one trigger pulse is received and operates in its other mode to close the switching device when another trigger pulse is received.

Thus, the exact circuitry utilized in the component blocks of FIG. 7 may be chosen by those skilled in the art without departing from the scope of this invention.

In some applications it may be desirable to provide more flexible arrangements for controlling the starting of the charging cycle. For example, a built-in delay circuit may be provided in the control amplifier or in the comparator to delay the time at which the control amplifier triggers the switching device to its closed position.

Under some conditions, it may happen that the thyratron doesn't completely de-ionize and the charging current may become excessive. An overload sensing element responsive to the charging current may be used to provide a signal to the control amplifier to cause it to open the switching device and interrupt the charging operation until de-ionization occurs.

Other modifications to the circuit may occur to those skilled in the art without departing from the spirit and scope of this invention. Hence, the invention is not to be construed to be limited to the particular embodiments described herein except as defined by the appended claims.

What is claimed is:

1. A charging regulator circuit for supplying energy to an output circuit, said regulator circuit comprising a source of direct energy; charging means including a primary charging coil connected to said energy source for transferring energy to said output circuit to provide a charging voltage for said output circuit; means connected to said primary charging coil and to said output circuit for selectively controlling the application of said energy to said output circuit, said means including a series switching element, a sensing element connected to said output circuit and responsive to said charging voltage for providing a voltage proportional to said charging voltage, and a control element connected to said switching element and to said sensing element responsive to said proportional voltage for controlling the said selective application of energy by said switching element; and means coupled to said primary charging coil and to said energy source for returning to said source the energy remaining in said primary charging coil in the absence of said energy transfer to said output circuit.

2. A charging regulator circuit for supplying energy to an output circuit, said regulator circuit comprising a source of direct energy; charging means including a primary charging coil connected to said energy source for transferring energy to said output circuit to provide a charging voltage for said output circuit; means connected to said primary charging coil and to said output circuit for selectively controlling the application of said energy to said output circuit, said means including a triode switching tube, a voltage sensing network connected to said output circuit and responsive to said charging voltage for providing a voltage proportional to said charging voltage, and a triode control tube connected to said triode switching tube and to said voltage sensing network and a responsive to said proportional voltage for controlling said selective application of said energy by said triode switching tube; and means coupled to said primary charging coil and to said energy source for returning to said source the energy remaining in said primary charging coil in the absence of said energy transfer to said output circuit.

3. A charging regulator circuit for suppling energy to an output circuit, said regulator circuit comprising a source of direct energy; charging means including a primary charging coil connected to said energy source for transferring energy to said output circuit to provide a charging voltage for said output circuit; means connected to said charging means for selectively controlling the application of said energy to said output circuit, said output circuit comprising a pulse forming network connected to said switching means and a magnetron load connected to said pulse forming network, said means including a triode switching tube connected in series with said primary charging coil and said output circuit, a voltage sensing network connected to said output circuit for providing a voltage proportional to said charging voltage, and a triode control tube connected to said triode switching tube and to said voltage sensing network and responsive to said proportional voltage for controlling said selective application of energy by said triode switching tube; and means coupled to said primary charging coil and to said energy source for returning to said source the energy remaining in said primary charging coil in the absence of said energy transfer to said output circuit.

4. A charging regulator circuit for supplying energy to an output circuit, said regulator circuit comprising a source of direct energy; charging means including a primary charging coil connected to said energy source for transferring energy to said output circuit to provide a charging voltage for said output circuit; means connected to said primary charging coil and to said output circuit for selectively controlling the application of said energy to said output circuit, said means including a series triode switching tube, a voltage sensing network comprising a series connection of a fixed resistor and a variable resistor connected to said output circuit and responsive to said charging voltage for providing a voltage proportional to said charging voltage, and a triode control tube connected to said triode switching tube and to the junction of said resistors and responsive to said proportional voltage for controlling said selective application of energy by said triode switching tube; and means coupled to said primary charging coil and to said energy source for returning to said source the energy remaining in said primary charging coil in the absence of said energy transfer to said output circuit.

5. A charging regulator circuit for supplying energy to an output circuit, said regulator circuit comprising a source of direct energy; charging means including a primary charging coil connected to said energy source for transferring energy to said output circuit to provide a charging voltage for said output circuit; means connected to said charging means for selectively controlling the application of said energy to said output circuit, said output circuit comprising a pulse forming network connected to said selective controlling means and a magnetron load connected to said pulse forming network, said selective controlling means including a triode switching tube connected in series with said primary charging coil and said output circuit, a voltage sensing network connected to said output circuit for providing a voltage proportional to said charging voltage, and a triode control tube connected to said triode switching tube and to said voltage sensing network and responsive to said proportional voltage for controlling said selective application of energy by said triode switching tube; and energy restoring means comprising a secondary coil coupled to said primary charging coil and a unidirectional element connected to said secondary coil and to said energy source for returning to said source the energy remaining in said primary charging coil in the absence of said energy transfer to said output circuit.

6. A charging regulator circuit for supplying energy to an output circuit, said regulator circuit comprising a source of direct energy; charging means including a primary charging coil connected to said energy source for transferring energy to said output circuit to provide a charging voltage for said output circuit; means connected to said charging means for selectively controlling the application of said energy to said output circuit, said output circuit comprising a pulse forming network connected to said selective controlling means and a magnetron load connected to said pulse forming network, said selective controlling means including a triode switching tube connected in series with said primary charging coil and said output circuit, a voltage sensing network connected to said output circuit for providing a voltage proportional to said charging voltage, and a triode control tube connected to said triode switching tube and to said voltage sensing network and responsive to said proportional voltage for controlling said selective application of energy by said triode switching tube; energy restoring means comprising a secondary coil coupled to said primary charging coil and a diode element connected to said secondary coil and to said energy source for returning to said source the energy remaining in said primary charging coil in the absence of said energy transfer to said output circuit; and a damping circuit connected across said primary charging coil.

References Cited in the file of this patent

UNITED STATES PATENTS

| | | |
|---|---|---|
| 2,383,492 | Klemperer | Aug. 28, 1945 |
| 2,598,134 | Schade | May 27, 1952 |
| 2,624,038 | Kurshan | Dec. 30, 1952 |
| 2,920,259 | Light | Jan. 5, 1960 |

FOREIGN PATENTS

| | | |
|---|---|---|
| 358,083 | Great Britain | Sept. 28, 1931 |